US006565100B1

(12) United States Patent
Marshall et al.

(10) Patent No.: US 6,565,100 B1
(45) Date of Patent: May 20, 2003

(54) HAND GRIPPING TOOL

(76) Inventors: Michael Joseph Marshall, 20 Tithe Barn Grove, Fords Farm, Calcot, Reading, Berkshire RG31 7YX (GB); Andrew David Wilkinson, 22 Downing Road, Tilehurst, Reading, Berkshire, RG31 5BB (GB)

( * ) Notice: Subject to any disclaimer, the term of this patent is extended or adjusted under 35 U.S.C. 154(b) by 0 days.

(21) Appl. No.: 09/830,950

(22) PCT Filed: Sep. 16, 1999

(86) PCT No.: PCT/GB99/03093

§ 371 (c)(1), (2), (4) Date: May 2, 2001

(87) PCT Pub. No.: WO00/20172

PCT Pub. Date: Apr. 13, 2000

(30) Foreign Application Priority Data

Oct. 7, 1998 (GB) .......................................... 9821888
Apr. 7, 1999 (GB) .......................................... 9907797

(51) Int. Cl.$^{7}$ .......................................... B23B 31/12
(52) U.S. Cl. .......................................... 279/36; 279/48
(58) Field of Search .......................... 279/35, 36, 37, 279/38, 39, 69, 74, 48, 50, 46.7, 46.1; 81/90.2

(56) References Cited

U.S. PATENT DOCUMENTS 1,515,272 A * 11/1924 Prentice
1,625,778 A * 4/1927 Nickerson
1,818,353 A 8/1931 Rolstad
1,990,525 A * 2/1935 Chancellor
3,252,210 A 5/1966 Bowden ...................... 29/267
3,735,650 A 5/1973 Weng, Jr. .................... 81/53.2
4,432,538 A * 2/1984 Sequin
5,052,250 A 10/1991 Clarke et al. ................. 81/114

FOREIGN PATENT DOCUMENTS

BE 442556 9/1941
EP 0 216 354 4/1987
EP 0 276 553 8/1988
FR 1 032 476 7/1953
GB 1 488 051 10/1977
GB 2200071 7/1988

* cited by examiner

*Primary Examiner*—Stephen Blau
(74) *Attorney, Agent, or Firm*—Westman, Champlin & Kelly, P.A.

(57) ABSTRACT

A hand tool comprising a core member extending along a longitudinal axis of the tool; at least two jaws moveable relative to the core member so as to be openable and closeable, but constrained in a forward direction substantially parallel with said longitudinal axis, a sleeve member arranged to be moveable substantially parallel with the longitudinal axis relative to the core member, the sleeve member having at least one forward facing jaw-engaging surface.

28 Claims, 12 Drawing Sheets

HAND GRIPPING TOOL

This application claims priority of International Application No. PCT/GB99/03093, filed Sep. 16, 1999, entitled A HAND GRIPPING TOOL (published in English), which in turn claims priority of Great Britain Application No. 9821888.6, filed Oct. 7, 1998, and Great Britain Application No. 9907797.6, filed Apr. 7, 1999.

BACKGROUND OF THE INVENTION

The present invention relates to hand tools for gripping objects and in particular, although not exclusively, to hand tools for gripping and extracting protruding screws, nails and other semi-permanent mechanical fastenings from walls and other surfaces, and to hand tools for holding common tools and accessories, such as blades and screw-driver bits.

During the refurbishment of surfaces, such as walls, it may be necessary or desirable to extract previously installed, now unwanted, semi-permanent mechanical fittings.

Damaged or stubborn mechanical fittings including pins, nails, heavy duty staples, wall plugs, self-tapping screws, studs and other similar obstructions are difficult and potentially dangerous to remove, and occasionally considerable damage occurs to the surrounding wall. Inappropriate extraction techniques can also lead to personal injury.

Known gripping and extraction tools include mole grips, pliers, pincers and claw hammers. Embodiments of the present invention aim to provide hand tools which are more flexible, easier to use, provide a firmer, more secure (and hence safer) grip, enable gripping of a wide range of shapes and sizes of objects, and enable a greater extraction force to be exerted on objects compared with known gripping and extraction tools.

SUMMARY OF THE INVENTION

According to the present invention there is provided a hand tool for gripping an object, the hand tool comprising a core member extending along a longitudinal axis of the tool; at least two jaws, moveable relative to the core member so as to be openable and closeable, but constrained in a forward direction substantially parallel with said longitudinal axis, at least a portion of each jaw extending from a first end of the core member generally in said forward direction when the jaws are closed, the respective extending portions each having a respective gripping surface; and a sleeve member arranged to be moveable substantially parallel with the longitudinal axis relative to the core member, the sleeve member having at least one forward facing jaw-engaging surface, the jaws, when open, each presenting a respective reverse facing engaging surface to the at least one jaw-engaging surface of the sleeve member; the sleeve member being progressively moveable in the said forward direction to urge the at least one jaw-engaging surface of the sleeve member against the reverse facing engaging surfaces of the jaws, constraint of the jaws in the said forward direction causing urging of the sleeve member against the jaws to force the jaws to close. The hand tool further comprising two lever pins (11) arranged to extend generally transverse to the longitudinal axis and coaxially from opposite sides of the hand tool at least when the jaws are closed, each lever pin extending from and being integral with a respective one of the jaws.

Preferably the sleeve member is generally cylindrical, extends along the longitudinal axis and is arranged coaxially with the core member such that it is movable to radially surround at least a portion of the core member.

Preferably the core member is generally cylindrical and comprises an external screw thread, and the sleeve member comprises a correspondingly threaded bore extending along the longitudinal axis and arranged to receive and threadably engage the core member such that movement of the sleeve member along the longitudinal axis relative to the core member is effected by rotation of the sleeve member with respect to the core member about the longitudinal axis.

Preferably the screw thread is left-handed. This is particularly advantageous when the hand tool is used for gripping and removing right-hand threaded objects from the surfaces in which they are embedded. The left-hand thread of the core member and sleeve member ensures that the hand tool's grip is not loosened when it is used to rotate the embedded object in the anti-clockwise direction in an attempt to remove it from the surface. The grip may, as a result of the left-handed thread, tighten as the object resists rotation.

The sleeve member may be generally cylindrical, and may comprise an outer surface adapted to be engaged by a spanner or socket for applying torque to the sleeve member about the longitudinal axis. Thus, a greater gripping force may be applied to the object. The adaptation to the sleeve member may take the form of a pair of diametrically opposed flats, or for example, an axially extending section of the sleeve member may have a generally hexagonal outer cross-section.

Advantageously, the sleeve member may comprise a handle portion adapted to facilitate gripping and rotation of the sleeve member by hand. The handle portion may, for example, take the form of a generally cylindrical portion of increased diameter to enable sufficient torque to be applied to the sleeve member by hand to achieve sufficient grip on the object.

Preferably, the sleeve member is not arranged to fully enclose the core member. Preferably a second end of the core member is arranged to extend through the sleeve member in the reverse direction beyond a first end of the sleeve member when the sleeve member is in contact with the jaws.

The protruding second end of the core member may be adapted to be engaged by a spanner or socket (for example it may be hexagonal in cross-section) and in addition, or alternatively, may be adapted to receive and be engaged by a socket drive. This adaption may take the form of a suitably dimensioned square cross-section orifice extending into the second end of the core member generally along the longitudinal axis.

Thus, substantial relative torque may be applied between the core member and sleeve member to close and lock the jaws onto an object, by use of standard hand tools engaging with suitably adapted surfaces of the hand tool.

Advantageously, the jaws, when forced closed by the sleeve member, are each arranged to extend beyond a second end of the sleeve member in the forward direction. This is particularly advantageous as the sleeve member does not then obscure the hand tool operator's view of the object to be gripped, and enables the operator to hold and manually close the jaw members on the object before tightening the grip by urging the jaw-engaging surface or surfaces of the sleeve member into contact with the corresponding engaging surfaces of the jaws.

The tool may comprise just two jaws.

Preferably, the gripping surfaces of the jaws are arranged to close generally radially and symmetrically on the longitudinal axis when the jaws are forced to close by the sleeve member.

Thus, the jaws may be adapted to open and expand radially to receive between their gripping surfaces an object inserted generally along the longitudinal axis.

The jaws may be coupled to the core member, forming a generally rotationally symmetrical arrangement around the longitudinal axis.

The jaws may be arranged such that when no object is inserted between their gripping surfaces, the jaws may be closed to bring their gripping surfaces into contact with each other generally on the longitudinal axis.

Preferably, the gripping surfaces of the jaws are adapted to provide a good grip on a wide range of shapes and sizes of objects. For example, each gripping surface may include a respective flat portion arranged to oppose the corresponding flat portion or portions on the or each other jaw, respective teeth arranged to intermesh with corresponding teeth on the or each other jaw, and/or respective teeth arranged to oppose but not intermesh with corresponding teeth on the or each other jaw.

Each gripping surface may in addition, or alternatively, comprise a generally V-shaped groove arranged to extend generally along the longitudinal axis to facilitate gripping of generally cylindrical objects aligned with the longitudinal axis.

Preferably, the or each forward facing jaw-engaging surface of the sleeve member is inclined to face the longitudinal axis such that contact with the corresponding engaging surfaces of the jaws applies a force to the jaws having a component transverse to the longitudinal axis (i.e. a radial component).

Preferably, the sleeve member has a single forward facing jaw-engaging surface which is generally frustoconical and is radially disposed symmetrically about the longitudinal axis.

Preferably, the hand tool has a rotational axis of symmetry co-linear with the longitudinal axis.

Preferably, the jaws are pivotally coupled to the core member, although other coupling arrangements are possible.

Preferably, each jaw comprises a respective pivot pin extending from a side of the jaw, each pivot pin being received in a corresponding respective slot in the core member, each said slot extending in a plane substantially perpendicular to the longitudinal axis, the jaws and core member being adapted to permit rotation of each jaw about its respective pivot pin in a plane substantially parallel to the longitudinal axis and to permit movement of each pivot pin, in its respective slot, transverse to the longitudinal axis. Thus, the jaws may hinge open but are also permitted a degree of purely translational motion relative to the core, namely a translation in a direction transverse to the longitudinal axis.

Advantageously, each jaw may comprise two of the said respective pivot pins, the two pivot pins of each jaw extending coaxially from opposing sides of the jaw, and the core member may comprise at least one further slot, the or each further slot extending in a plane including or parallel to the longitudinal axis and hence perpendicular to the plane of the slots receiving the two pivot pins of a respective one of the jaws, the or each further slot being arranged to accommodate a portion of a respective one of the jaws to permit rotation of the jaw about its pivot pins.

Preferably, the further slot or slots are arranged to engage side surfaces of the accommodated portions of the jaws to contain rotation of the jaws about the longitudinal axis relative to the core. Thus, torque about the longitudinal axis may be transmitted to the jaws by means of the core member.

Advantageously, the hand tool may have two jaws, the respective slots, pivot pins, jaws and core member being arranged to permit parallel separation of the gripping surfaces.

This feature enables the jaws to provide a firm and extended grip on generally cylindrical objects.

Advantageously, the pivot pins may be constrained in their respective slots by the sleeve member at least when the jaws are closed, and the sleeve may be movable in the reverse direction sufficiently to release the pivot pins from their respective slots to enable decoupling of the jaws from the core, and hence enable removal and replacement of jaws from the tool.

Thus, the jaws may be replaceable, and different jaws may be utilised (i.e. coupled to the core member) according to the nature of the object to be gripped and/or extracted.

Advantageously, for each jaw, the respective reverse facing engaging surface is generally inclined at an angle to the respective gripping surface, the angle of inclination being generally the same as that between the jaw-engaging surface or surfaces of the sleeve member and the longitudinal axis.

This feature, when coupled with transverse movement of the jaw pivot pins in their slots with respect to the longitudinal axis, enables a relatively large contact area to be maintained between the sleeve member and each jaw for a range of jaw separations. The rear facing engaging portions of the jaws are thus inclined at the same angle as the jaw-engaging surface of the sleeve member to the longitudinal axis provided that the gripping surfaces are parallel to the longitudinal axis.

Although the jaws may be arranged to present respective reverse facing engaging surfaces to the sleeve only when the jaws are open, it is preferable that these engaging surfaces are presented to the jaw-engaging surfaces of the sleeve even when the jaws are closed to enable tightening of the jaws onto even very small objects.

This may be achieved by employing jaws which taper sufficiently outward (i.e. transverse to the longitudinal axis) in the forward direction from the core member.

Preferably, the hand tool comprises at least one spring arranged to bias the jaws open.

Advantageously, the hand tool may further comprise two lever pins arranged to extend generally radially (transverse to the longitudinal axis) and coaxially from opposite sides of the hand tool, at least when the jaws are closed.

The pins may be used to facilitate the manual application of torque to the sleeve member or core member to close or release the jaws, or may be engaged by a lever pivoting on a fulcrum to pull the hand tool from a surface.

Preferably, each lever pin extends from and is integral with a respective one of the jaws such that when the lever pins are used to pull the hand tool (for example to extract a gripped object from a wall), the grip is not loosened, as might be the case if the pins were located on the sleeve member.

Preferably, the hand tool may be combined with a lever assembly comprising a lever having a first end adapted to engage the lever pins of the hand tool, a second end providing a handle, and fulcrum pins extending transversely and coaxially from a region between the first and second ends, a plate member for positioning against a surface from which an object is to be extracted, and a fulcrum pin support member extending in a direction generally perpendicular to the plate member and providing a support for the fulcrum pins.

The fulcrum pin support member may, advantageously, be adapted to provide an adjustable height support for the fulcrum pin relative to the plate member.

DESCRIPTION OF THE PREFERRED EMBODIMENTS

Figure 13:
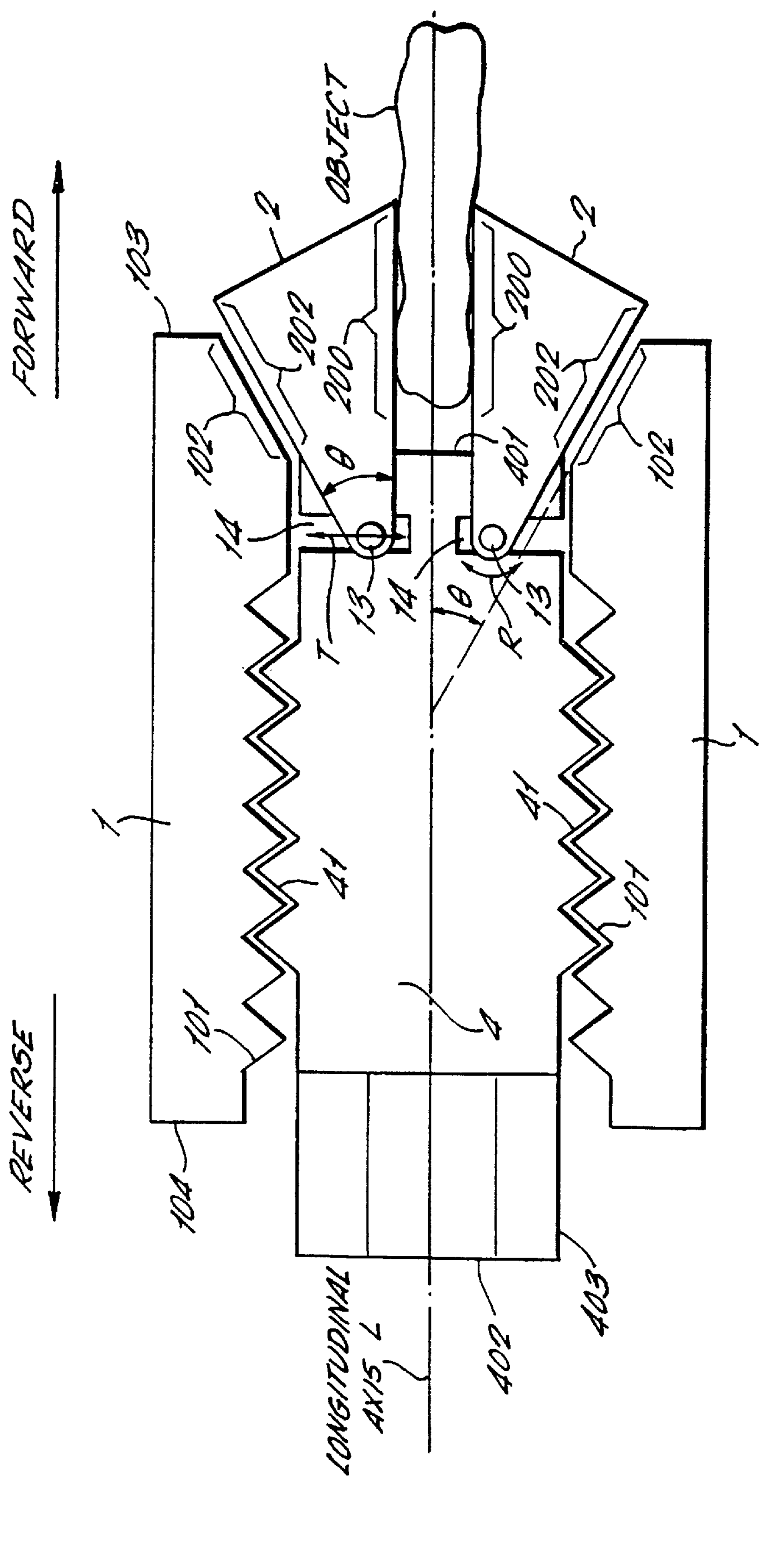
FIG. 13 is a schematic diagram of a hand tool embodying the present invention.

Referring now to FIG. 13, this Figure is a highly schematic diagram of a hand tool embodying the present invention, and is intended to illustrate some of the essential and optional features of the present invention. The hand tool of this example comprises a generally cylindrical core member 4 extending along a nominal longitudinal axis L and having a first end 401, facing a nominal forward direction, and a second end 402, nominally facing reverse.

Two jaws are arranged at the first end 401 of the core and are coupled to the core member 4 by means of pins 13 received in slots 14 in the core, the slots extending in a plane generally perpendicular to the longitudinal axis L.

The coupling between the jaws 2 and the core 4 allows the jaws to open and close but constrains their movements in the forward and reverse directions, generally parallel to the longitudinal axis.

A portion of each jaw extends from its pivot pin 13 beyond the first end 401 of the core and includes a respective gripping surface 200.

A generally cylindrical hollow sleeve member 1 partly surrounds the core member and extends generally coaxially with the core member along the longitudinal axis. In the Figure, the sleeve is shown in cross-section. An inner bore of the sleeve comprises a screw-thread 101 that engages a corresponding external thread 41 on the core member. Relative rotation of the core 4 and sleeve 1 about the longitudinal axis L causes relative axial movement between these two members.

By appropriate relative rotation with respect to the core member, the sleeve member 1 is progressively movable in the forward direction to bring a forward facing jaw-engaging frustoconical surface 102 into contact with the corresponding rear facing engaging surfaces 202 of the jaws. Further forward movement of the sleeve forces the jaws to close as a result of their coupling to the core member. The rear facing engaging surfaces of the jaws 202 are inclined at an angle θ to the gripping surface 200. The jaw-engaging surface 102 of the sleeve 1 is also inclined at the angle θ to the longitudinal axis L. Thus, when the gripping surfaces are substantially parallel to the longitudinal axis, the total contact area between the sleeve member and jaws is a maximum.

The jaws are able to rotate about their pivot pins (see the arrow R) in a plane including the longitudinal axis L. However, the pivot pins are also able to slide transverse to the longitudinal axis in their slots 14 (in the general direction shown by the arrow T). This sliding movement enables the jaws to open and close to a degree with their gripping surfaces 200 parallel, and so facilitates secure gripping of objects extending along the longitudinal axis.

The combination of rotational movement about the pivot points, and the sliding of the pivot axes transverse to the longitudinal axis enables the tool to provide a secure grip on a wide variety of shapes and sizes of objects.

The common angle of inclination between the engaging surfaces 202 of the jaws and their gripping surfaces 200, and between the jaw-engaging sleeve surface 102 and the longitudinal axis L enables the maximum contact area between sleeves and jaws to be maintained whilst closing the jaws gripping surfaces in parallel.

In this example the jaws 2 are arranged to extend beyond the forward end 103 of the sleeve 1 even when fully closed, so that the user's view of the object to be gripped is not fully obscured by the sleeve 1. This arrangement also enables the jaws to be held closed by hand on the object while the sleeve is rotated to bring it forward and lock the jaws onto the object.

Furthermore, in this example, the sleeve is fully separable from the core by unscrewing in the reverse direction. For a range of forward positions, the sleeve member constrains the pivot pins 13 in their slots 14, but once the sleeve is moved sufficiently far in a rearward direction, the pins can be removed from their slots and the jaws can be fully decoupled from the rest of the tool. Thus, the jaws are removable/interchangeable and different shaped jaws can be inserted, depending on the intended use of the tool.

The sleeve member and core member are further arranged such that when the sleeve is positioned to close the jaws, the second end 402 of the core 4 protrudes through the sleeve, beyond its reverse facing end 104.

An axially extending section 403 of the core at the second end 402 is hexagonal in cross-section to enable torque to be applied to the core member by means of a spanner or socket.

Figure 1:
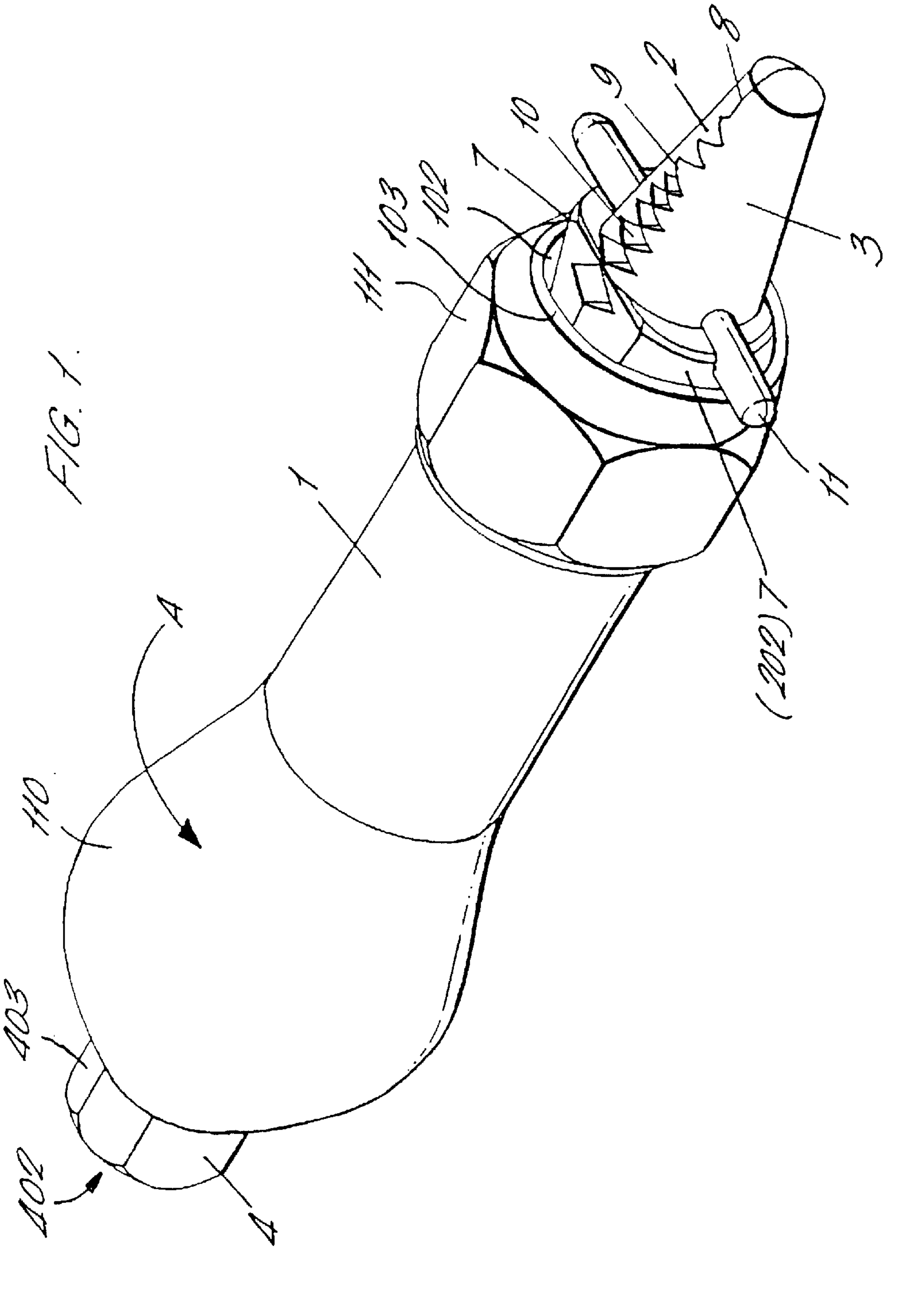
FIG. 1 shows an isometric view of an extraction tool embodying the present invention, with jaws closed.

FIG. 1 shows a perspective view of a further hand tool embodying the present invention. The principle of operation of this embodiment is generally the same as that of the example shown in FIG. 13. In the example of FIG. 1, the sleeve member 1 is adapted to provide a handle portion 110 of increased diameter to facilitate gripping and rotation of the sleeve. A forward portion of the sleeve member takes the form of a hexagonal nut 111 and a forward facing jaw-engaging frustoconical surface 102 is provided by an inner surface of this nut portion 111. The flat sides of the nut portion 111 may be engaged by the driving surfaces of a spanner to enable increased torque to be applied to the sleeve member.

The embodiment of FIG. 1 includes just two jaws 2, 3. In this Figure the jaws are shown closed, with their rear facing sleeve engaging surfaces 7 (i.e. 202) in contact with the jaw-engaging surface 102 of the sleeve member.

Each jaw member 2, 3 comprises a pin 11 which extends generally transverse to the longitudinal axis when the jaws are closed. These pins 11 facilitate manual holding of the jaws and core member 4 as the sleeve member is rotated relative to them, and further enable a suitably adapted lever to be inserted underneath the pins to lever the tool away from a surface, and so facilitate extraction. By locating these pins 11 on the jaws 2, 3, the gripping force applied to the object is not loosened as the hand tool is pulled in the nominal reverse direction.

As can be seen from the Figure, the gripping surfaces of the jaws comprise different regions, to facilitate gripping of a wide variety of shapes and sizes of objects. At the forward-most end of the jaws the gripping surface comprises a flat 8. At an intermediate position the jaws include intermeshing teeth 9, and at a more rearward position the jaws include teeth which oppose each other, meet at points, but do not intermesh. These opposing teeth provide cavities between the jaws even when they are fully closed together.

Figure 2:
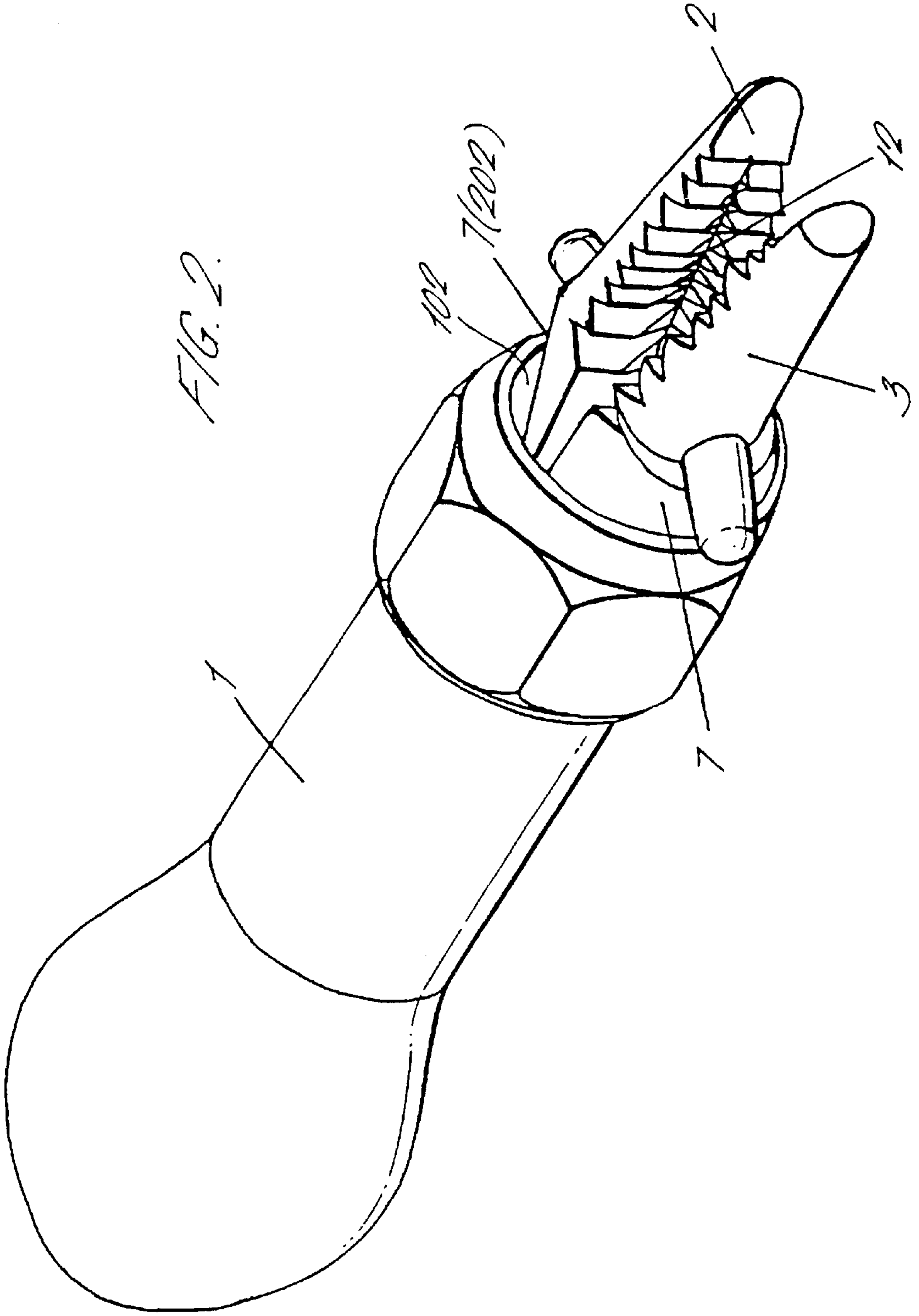
FIG. 2 shows an isometric view of the extraction tool of FIG. 1, with jaws open.

Referring now to FIG. 2, this Figure shows the embodiment of FIG. 1 again in perspective view, but this time with the jaws open. The sleeve member 1 has been unscrewed relative to the core member and has moved in the reverse direction, such that the jaw-engaging surface 102 no longer forces the jaws closed. With the jaws open, a further feature of the gripping surfaces can be seen. A V-shaped groove 12 is provided on each gripping surface, extending along the length of each jaw such that it runs, in use, generally along the longitudinal axis. In this example, the depth of the groove 12 varies along the length of the jaws. The V groove enables the jaws to grip objects extending along the longitudinal axis, such as screws and nails more securely.

Figure 3:
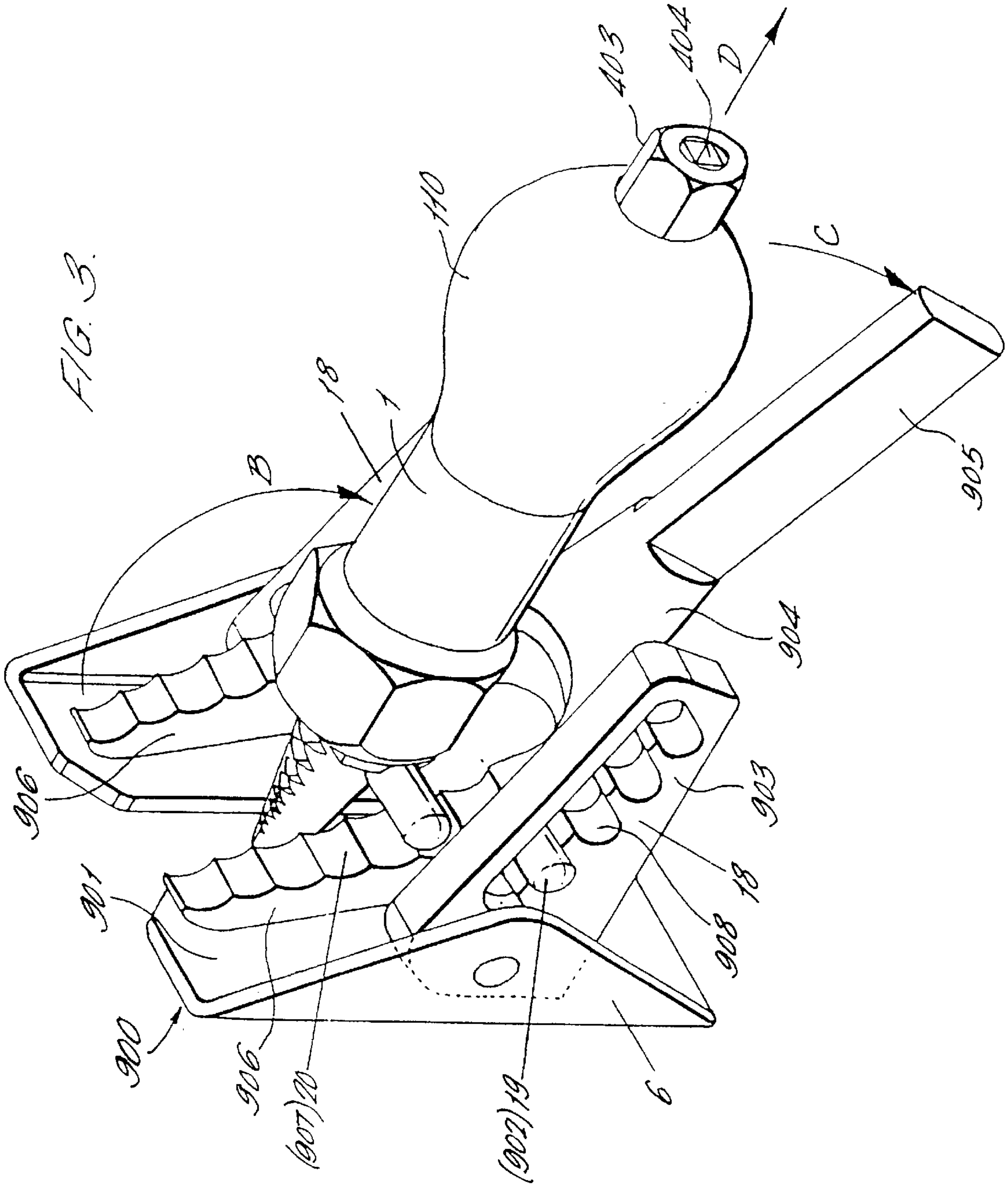
FIG. 3 shows a perspective view of the extraction tool of FIGS. 1 and 2 in combination, with extraction lever and integral plate.

FIG. 3 shows the hand tool of FIGS. 1 and 2 in combination with a lever assembly which enables a greater extraction force to be applied to an object partially embedded in a surface.

The lever assembly shown in FIG. 3 comprises a lever 904 having a first end adapted to engage the lever pins 11 of the hand tool. This first end of the lever 904 comprises two prongs 906 arranged to pass under the lever pins and on either side of the hand tool. The prongs each include a scalloped surface 907 to engage the lever pins of the hand tool at a number of selectable positions along the prongs lengths.

The lever 904 includes a second end providing a handle 905, and two fulcrum pins 902 extending coaxially from either side of the lever at the base of the prongs.

The lever assembly 900 further comprises a plate member 901 for positioning against a surface from which an object is to be extracted. Fulcrum pin support members 903 are pivotally coupled to the plate member 901 and are each rotatable in the direction generally shown by the arrow B in FIG. 3 to extend in a direction generally perpendicular to the nominal surface engaging front face of the plate member 901. Each fulcrum pin support member includes a plurality of fulcrum pin engaging recesses 908, each providing positive location for the fulcrum pins at a respective distance from the surface engaged by the front face of the place member 901. Thus, the fulcrum pin support members provide for adjustment of the "height" of the lever's fulcrum above the surface from which the object is to be extracted. The lever can be fully disengaged from the fulcrum pin support members when not in use, and also the support members 903 may be folded flat against the plate member 901 for ease of storage and transportation.

The scalloped prongs 906 of the lever 904 enable the separation between the axis of the lever pins and the axis of the fulcrum pins to be adjusted so that, in turn, the mechanical advantage afforded by the lever in applying an extraction force in the direction D to the hand tool can be varied. By moving the fulcrum pins 902 into recesses 908 progressively further from the plate member 901, the lever assembly can be used to apply a large extraction force to an object as it is progressively pulled from a surface.

In FIG. 3, the generally hexagonal end 403 of the core member can be clearly seen protruding from the rear facing end of the sleeve member. Also, the Figure clearly shows a square cross-section recess 404 extending into the core member in the forward direction. This recess 404 is dimensioned to receive the square driving pin of a socket ratchet.

Figure 4:
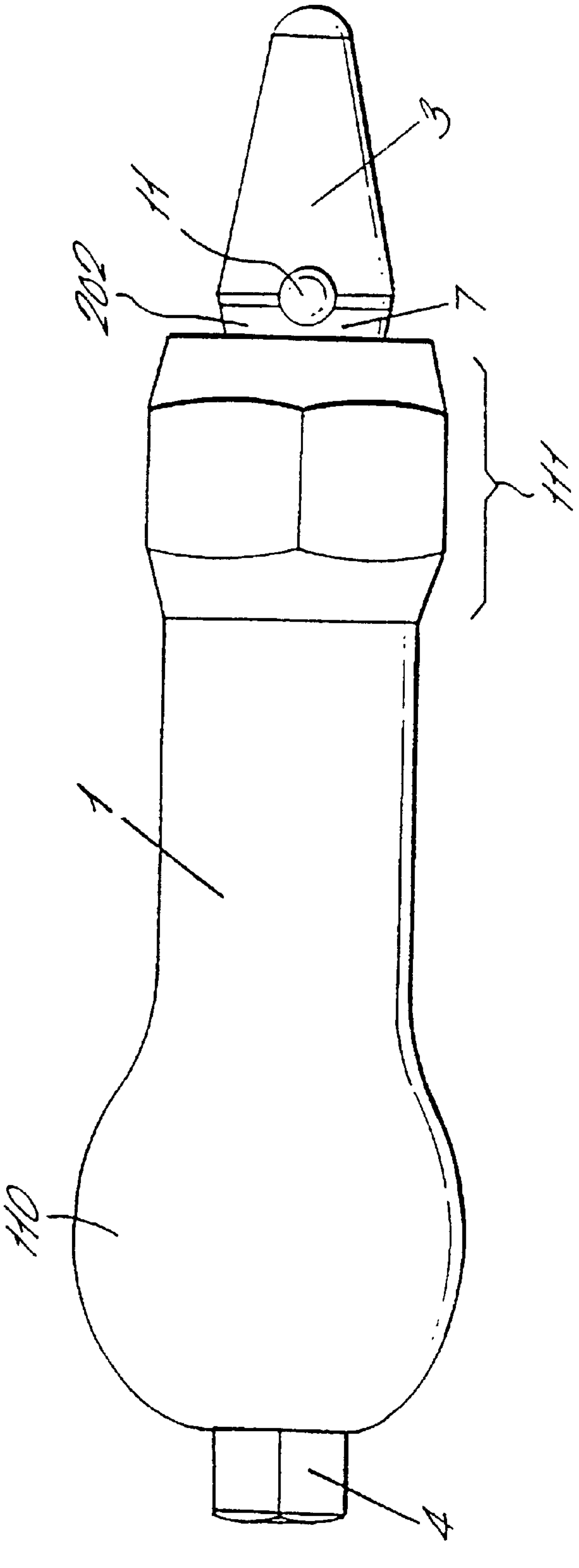
FIG. 4 shows a side view of the extraction tool of FIG. 1.

FIG. 4 shows a side view of the hand tool of FIG. 1. The hexagonally profile, axially extending front portion 111 of the sleeve member 1 may also be termed a "collar portion" or "nut portion".

Figure 5:
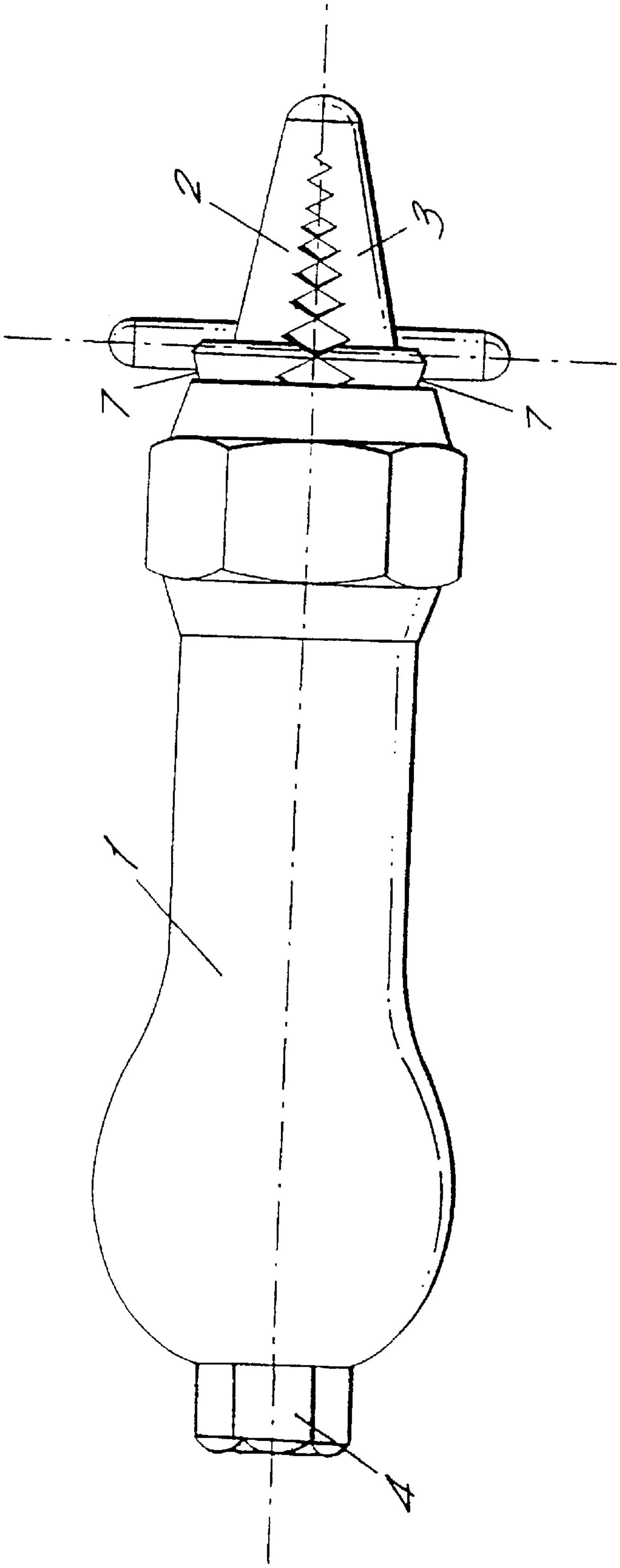
FIG. 5 shows a plan view of the extraction tool of FIG. 1.
Figure 7:
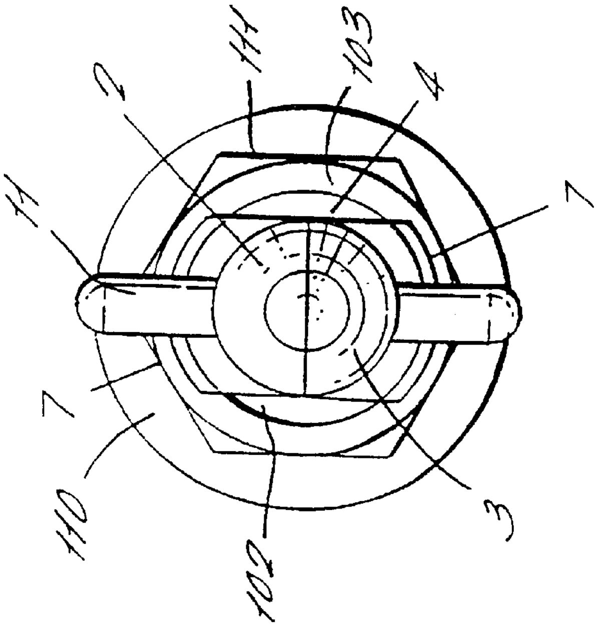
FIG. 7 shows a front view of the extraction tool of FIG. 1.
Figure 6:
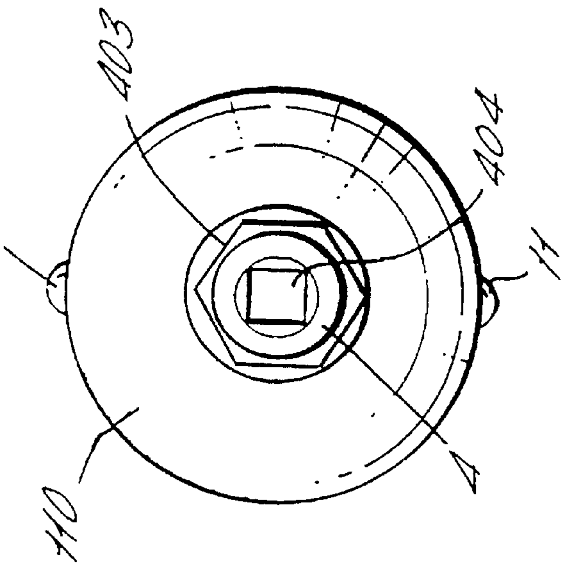
FIG. 6 shows a rear view of the extraction tool of FIG. 1.

FIG. 5 shows a plan view of the hand tool of FIG. 1 and FIGS. 6 and 7 show rear and front views respectively.

Figure 8:
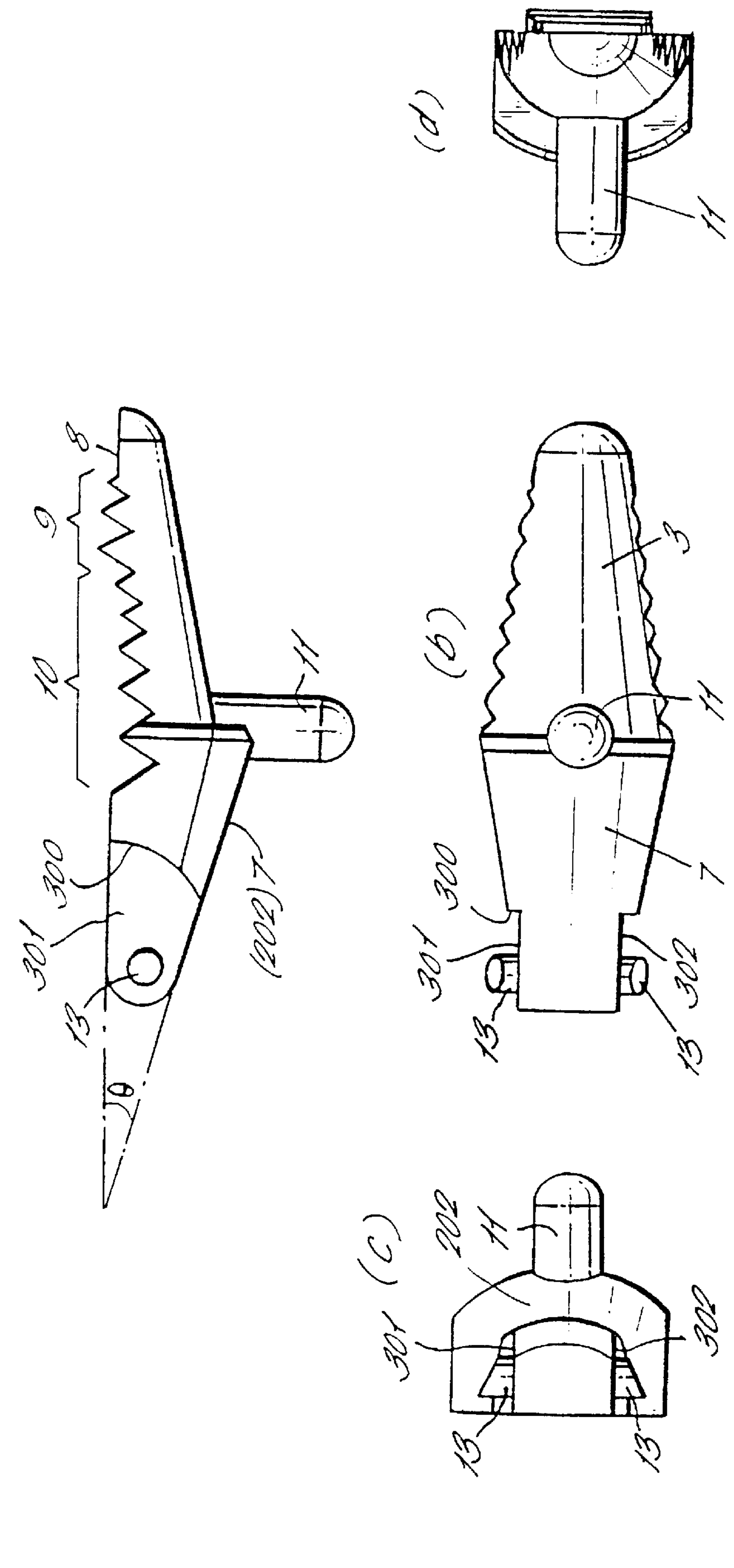
FIGS. 8(*a*)–(*d*) show plan, side, rear and front views respectively, of one of the jaws of the extraction tool of FIG. 1.
Figure 10:
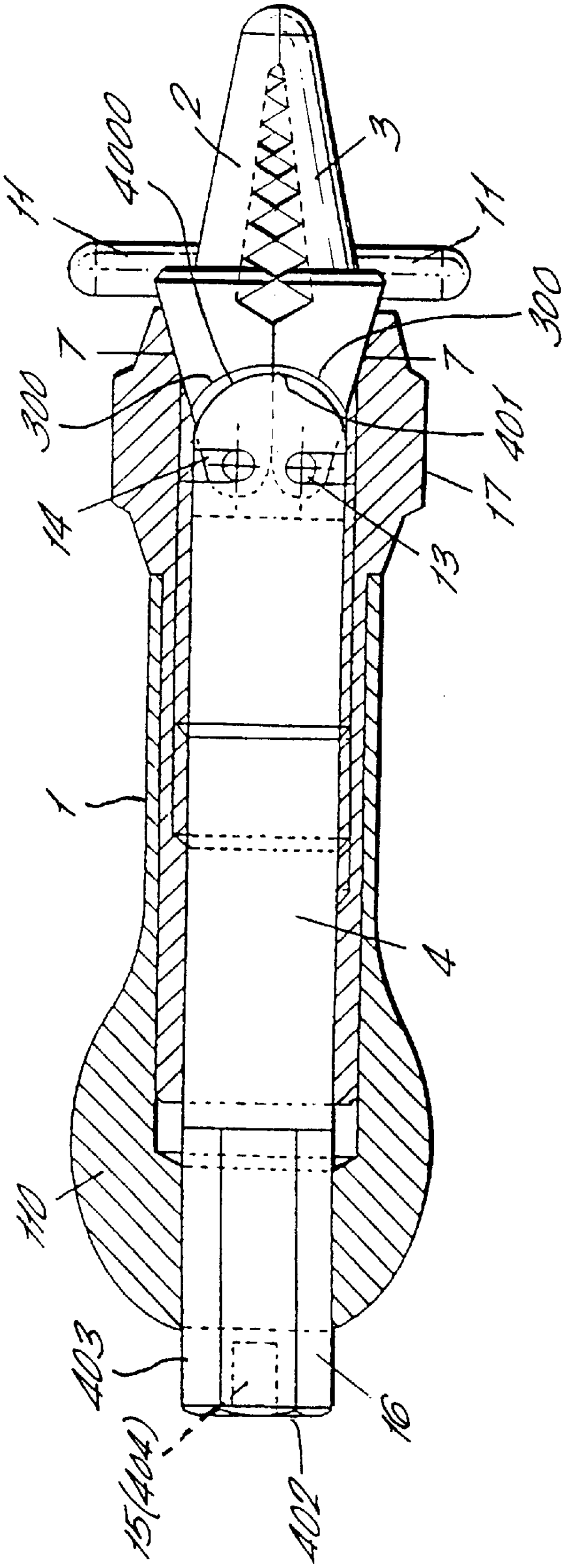
FIG. 10 shows a part-section of the orthographic plan view of the extraction tool of FIG. 1.

FIGS. 8(*a*)–8(*d*) show plan, side, rear and front views respectively of the right jaw 3 of the hand tool of FIG. 1. In these Figures, the different regions 8, 9 and 10 of the gripping surface can be clearly seen. Region 8 is substantially flat, region 9 comprises teeth arranged to intermesh with teeth on the opposing jaw, and region 10 includes teeth arranged to oppose but not intermesh with corresponding teeth on the opposing jaw, thereby leaving cavities between these teeth. A surface 300 of the jaw is profiled to maintain clearance around the bull-nose 4000 at the forward end of the core member as the jaw rotates about its pivot pins 13. The jaw 3 includes two pivot pins 13 protruding coaxially from opposing sides 301, 302 of the jaw. The opposing sides 301 and 302 are substantially parallel and are engaged by the inner surface of the main transverse slot M running through the bull-nosed end of the core member. In FIG. 10, for example, the main transverse slot extends in the plane of the page.

Returning to FIG. 8, the axis of the pins 13, about which the jaw pivots, is parallel to the general plane of the gripping surface and perpendicular to the axis along which the lever pin 11 extends. The rear facing sleeve-engaging surface 202 of the jaw is inclined at an angle $\theta$ to the general plane of the gripping surface. The right jaw 3 of the gripping tool is shown in perspective view in FIG. 9.

In FIG. 10, which is a plan view of the gripping tool, the bull profiled nose 4000 of the core member 4 can be clearly seen, cleared by the profiled surface 300 of the jaws. The sleeve member 1 is shown in cross-section, and it can be seen that the sleeve member is fabricated from a number of components. One component includes the handle portion 110, and another the hexagonally profiled collar, together with the threaded inner surface (i.e. bore). In this Figure, details of the thread on the core member and sleeve member are not shown.

Figure 11:
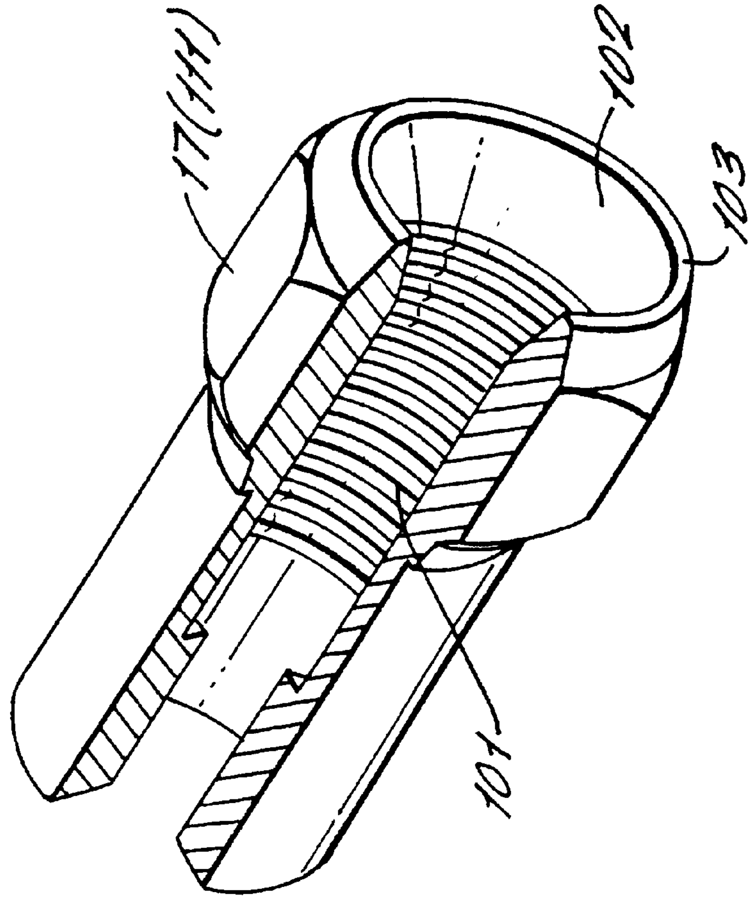
FIG. 11 shows a cutaway isometric view of the sleeve of the extraction tool of FIG. 1.

FIG. 11 shows a cut-away perspective view of one component of the sleeve member shown in FIG. 10. The inner screw threaded surface 101 of the component can be seen, along with the frustoconical jaw-driving surface 102 and collar portion 111.

Figure 12B:
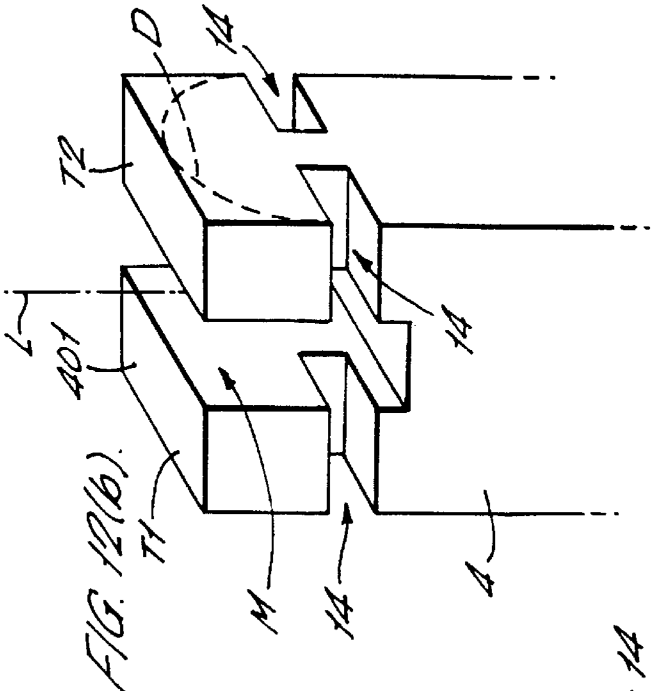
FIG. 12 shows a schematic cutaway isometric view of the extraction tool of FIG. 1.
Figure 12A:
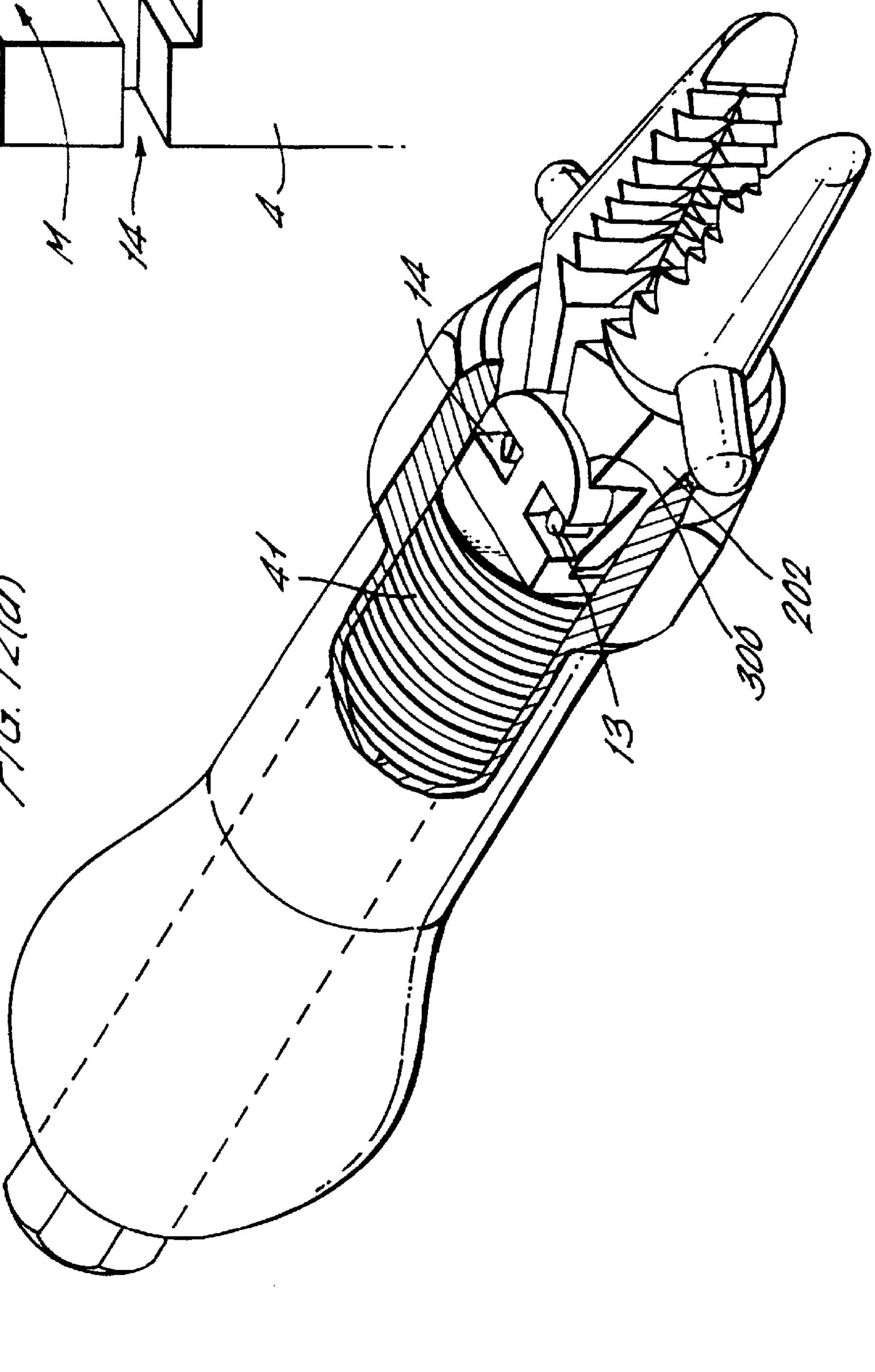

FIG. 12(*a*) shows a schematic cut-away illustration of the hand tool of FIG. 1, showing the threaded outer surface of 41 of the core member 4.

FIG. 12(*b*) is a schematic perspective view of the forward end of the core member of the embodiment shown in FIGS. 1–11, illustrating the relative positioning of the main and pivot receiving slots with respect to the longitudinal axis L. The main transverse slot M extends in a plane including the longitudinal axis and at right angles to the pivot pin receiving slots 14. The pivot receiving slots 14 and the main slot M intersect. Side surfaces M2 of the main transverse slot M engage side surfaces 301, 302 of the jaws, enabling torque to be transmitted from the core member to the jaws about the longitudinal axis L. In the highly schematic FIG. 12(*b*), the ends of the core member are shown generally square. In preferred embodiments of the present invention, however, the end is profiled, as shown by the broken line D.

When the pivot pins of the jaws are located in their respective slots 14, forward movement of the jaw along the longitudinal axis is constrained by the T-bar members T1 and T2.

Features of the embodiment shown in FIGS. 1–12 are as follows:

Part 1: sleeve member incorporating handle; Part 2: left jaw; Part 3: right jaw; Part 4: core; Part 5: spring for jaws; Part 6: lever and integral plate (also referred to as part 900); Feature 7: linear cams (engaging surfaces 202); Feature 8: flat portion jaw grip; Feature 9: crocodile teeth, crinkle and grasping jaw; Feature 10: widening serrated cavity jaw to accommodate form of foreign object (e.g. screw heads) Feature 11: external jaw fulcrum (lever) pins; Feature 12: longitudinal tapering "V"; Feature 13: jaws hinge (pivot) pins; Feature 14: slots in T bar of the products core; Feature 15: ¼ inch drive; Feature 16: 20 mm hexagonal feature; Feature 17: 38 mm nut portion of sleeve member; Feature 18: pressure plate stand-off (also known as fulcrum pin support member); Feature 19: forks lever trunnion (also known as lever fulcrum pins 902); Feature 20: scalloped location point (907).

As shown in FIG. 2, the internal jaw design reduces the chance of the extraction tool slipping and twisting off the mechanical fastening when in use. This is due to the combined features which constitute the internal surfaces of the jaw, longitudinal tapering "V" feature 12 and changing profile of the jaws 8, 9, 10; the latter illustrated in FIG. 9.

Figure 9:
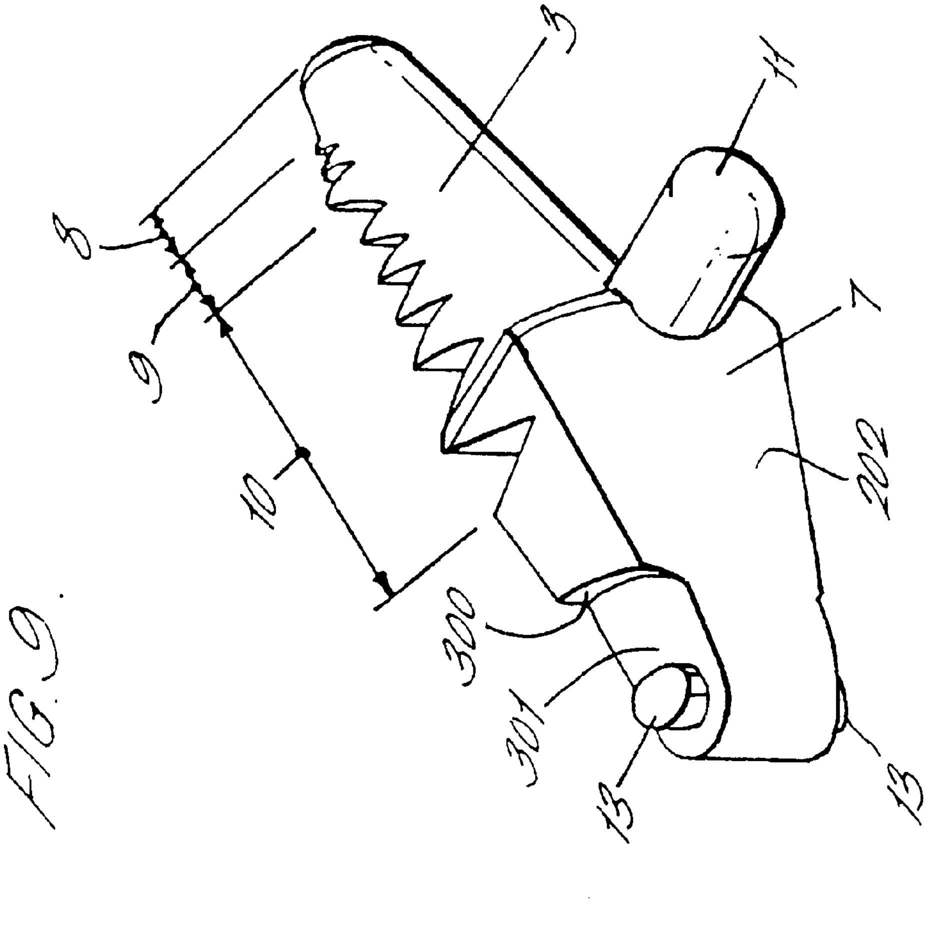
FIG. 9 shows an isometric illustration of the jaw of FIGS. 8(*a*)–(*d*)

FIGS. 8 and 9 shows the flat pinching shape of the jaw feature 8 which minimises the risk of cutting the foreign objects in two. The mid-section of the jaw has grasping, interlocking teeth feature 9. The symmetrical shape of the jaws teeth feature 10 accommodates the larger fastening and screw heads.

FIG. 10 illustrates how the jaw is designed to close in two planes to improve flexibility and ensure adequate location; the jaws close in a pincer movement and also in parallel motion. This is possible because the jaws hinge pins 13 rotate and slide horizontally within the slots 14 of the generally T-bar shaped end of the products core 4.

The addition of a spring Part 5 makes the jaws self-opening.

The jaws 2 and 3 are designed with easy removal in mind; this allows fast, efficient disassembly-assembly, without the use of tools or accessories, for maintenance, cleaning or jaw replacement.

It is envisaged that jaw replacement would allow greater flexibility and enhance performance. Hardened steel serrated jaws 2 and 3 are illustrated in the drawings, but aluminium soft jaws to minimise damage to objects or very soft nylon/rubber jaws for delicate holding operations are conceivable. So too are jaws designed to grasp hexagonal nuts and hex. screw driver bit accessories, a variety of punches, bradawls and centre punches, as well as common knife blades and piercing saws.

It is envisaged that the extraction tool will be initially tightened on the mechanical fastening by hand. The handle 1 is turned in the direction illustrated by arrow A in FIG. 1 while the jaws 2 and 3 are held. A greater closing force can then be applied by the use of standard tools. (A socket set can fit into the back of the unit as a ¼ inch drive feature 404 (15), or a 20 mm socket/spanner can be used on the hexagonal feature 17 of the core 4. The rotating handle 1 has a nut portion to accommodate a 38 mm spanner).

In some situations the improved grip of the jaws and the torque of the handle will provide enough of a mechanical advantage to unscrew, loosen and extract objects. More stubborn objects can be tackled with the provision of the extraction lever 904 and its integral pressure plate part 6 (901). (See FIG. 3) The lever's fulcrum height in the mechanism is fully adjustable to allow the extraction tools jaws to reach within a surface or operate away from the surface. The stand-offs 18 fold up for operation arrow B, until they stand flat on the plate (901). Slots in the stand-off allow rapid height adjustment, they are also inclined to give the fork's lever trunnions 19 (902) positive location during operation. The fork's lever trunnions rest in an "over centre" position in the stand-off and this prevents the mechanism from collapsing in operation. Pressing the lever (905), arrow C, causes a near linear extraction force, arrow D to be applied. The forked lever has a selection of scalloped location points 20 which allow either a high mechanical advantage near the fulcrum or a high velocity ratio at its end. When not in use the unit folds flat. All pins are in fixed single shear.

The pressure plate is designed to protect and minimise damage to the surrounding wall. The lever and plate provide a much greater mechanical advantage for linear extraction.

It will be apparent that the above-described hand tool provides a new, safer method of efficiently extracting mechanical fittings. The tool combines the:

- pinching grip of pliers,
- purpose designed serration and parallel jaw movement of a vice, to achieve secure grip on the object,
- a hands-free, self-locking action,
- the ability to apply torque to the gripped object maximised by optional use of common tools,
- a simple hand operation, and
- the flexibility to increase mechanical advantage and so aid extraction by the optional use of a lever engaging the hand tool.

The product described above is designed to be a "locking" extraction tool, which means that once located and tightened it stays attached to the mechanical fastening concerned.

The jaw design resists slipping and twisting off the mechanical fastening when in use.

The shape of the jaw accommodates the larger fastening and screw heads.

The shape of the jaw minimises the risk of cutting the object in two.

The jaw is designed to close in two planes to improve flexibility and adequate location; the jaws close in a pincer movement and also in parallel motion.

The addition of a spring makes the jaws self-opening.

In addition the jaws are designed with easy removal in mind; this allows fast, efficient disassembly, without the use of tools or accessories, for maintenance, cleaning or jaw replacement.

Jaw replacement allows the use of hardened steel serrated jaws, aluminium soft jaws to minimise damage to objects, or very soft rubber jaws for delicate holding operations.

The extraction tool may be initially tightened on the mechanical fastening (i.e. object to be gripped) by hand. A greater closing force can then be applied by the use of standard tools. (A socket set fits into the back of the unit as a ¼ inch drive or 20 mm socket/spanner and the rotating handle has a nut to accommodate a 38 mm open spanner).

In some situations the improved grip of the jaws and the torque of the handle will provide enough of a mechanical advantage to unscrew, loosen and extract objects. More stubborn objects can be tackled with the provision of the extraction lever with its integral pressure plate.

The pressure plate is designed to protect and minimise damage to the surrounding wall. The lever and plate provide a much greater mechanical advantage for linear extraction.

Although the above tool has been described with reference to the extraction of objects for surfaces such as walls, it will be apparent that hand tools embodying the present invention may be used in a wide variety of applications, and different interchangeable jaws may be selected to suit the application.

The extraction tool of FIG. 1 comprises a pair of "plier" jaws which close as the extraction tool's "screwdriver" handle is rotated.

The mechanical actuation of the tool's jaws is made possible through the use of an internal screw thread and the integral internal taper which acts on linear cams arranged in the design of the jaws.

The mechanical advantage of the unit can be enhanced through the use of common tools being brought to bear on its external surfaces.

The jaws remain locked in the closed position until the extraction tool's mechanism is released by unscrewing the handle and releasing the force acting on the linear cams arranged in the design of the jaws.

The jaws have a flat pinching end, leading to a cross meshing, biting jaw and then ending with symmetrically locating serrations which provide adequate cavities to encapsulate mechanical features of a foreign object.

The jaws articulate on pivot pins from a variable slot allowing parallel closing and pinching grip.

A purpose designed lever and integral surface pressure plate can be used in conjunction with the extraction tool's jaw fulcrum pins.

The described jaws can be removed and/or exchanged from the slotted central core without the need for the units disassembly or auxiliary tools.

Thus, a multi-purpose holding and extraction tool embodying the present invention comprises A: of a pair of shaped jaws.

The overall shape is that of pinching long nose pliers, the face of each opposing jaw has a combination of internal gripping surfaces to satisfy different tasks, the front nipping face is essentially flat, mid-point there are intermeshing gripping teeth and at the rear geometrically opposed serrations for additional grasping. Longitudinally each face incorporates a V-shaped channel cut from front to back, to the rear on the jaws it is deeper, this creates point contact for the teeth and allows round and hexagonal components to be encapsulated by the jaws. The V slot is cut at an angle of 120 degrees which provides adequate cavities to encapsulate mechanical features of foreign objects like hexagonal nuts and bolt leads across their corners.

Behind the long nose of the jaws are the trunnion pins which are perpendicular to the jaws and allow a fixture for the tool to be levered away from a surface using an appropriate double pronged lever.

In addition the rounded trunnion pins permit the user to prevent the jaws from rotating while the tool handle is being rotated, necessary during tightening and releasing of the jaws.

The external side/rear of the jaws are arranged as linear cams. They are tapered to the rear and are rounded axially so as to rotate and fit within the revolving collar of the tool's handle.

The rear of the jaws have two flattened top and lower planes so shaped to allow the jaws to fit inside the main horizontal slot, formed in the inner core 4. The jaws forward profile remain proud to compliment the bull-nose of the inner core. The arrangement ensures that the jaws cannot twist out of their opposed alignment, but they can revolve and slide independently in the desired horizontal plane. The slot fit ensures that torque can be transferred to the jaws through the inner core if required.

To prevent the jaws from pulling out of the horizontal slot, each jaw has vertical coaxial pins which locate into the vertical slots of the top and lower "T" bars on the threaded inner core. These rigid fulcrum pins allow each jaw to pivot independently opening like a beak or/and the jaws can slide transversely allowing the jaws to expand parallel with each other in the horizontal plane. The latter ensuring that mechanical fastenings like studs can be held along their length.

As the extraction tool's handle is rotated along the screw thread of the inner core, its tapered collar covers the jaws fulcrum pins preventing them from leaving the inner core.

As it engages the linear cams of the jaws, the result is that the jaws close, compressing the return spring and tightening the jaws.

Reversing the action, by rotating the handle and collar back along the inner core releases the pressure on the jaws tapers and the jaws are urged apart by the jaw return spring. This is the only way to release the jaws.

B: An inner threaded core extending axially through the handle which is engaged threadably with the external handle.

The inner core incorporates a front bull-nosed end to allow the jaws to pivot as a beak without corner interference.

It incorporates a wide horizontal slot into which the jaws slide from opposing sides, the fulcrum pins of the jaws locate into the smaller T slots. The main slot ensures that the jaws can slide open but cannot twist out of opposing alignment. Further it allows the tool to transfer torque to the jaws if it is required.

The smaller T slots hold the jaws fulcrum pins and prevent the jaws from being pulled out of the cores main slot. They ensure that the jaws can pivot and expand transversely as the tool's handle is retracted along the threaded inner core.

The inner core is threaded to allow the handle to advance or retract, the internal tapered collar at the front of the handle interacts with the linear cams of the jaws closing or releasing them. The thread allows a high mechanical advantage in the mechanism.

The inner core extends from the rear of the handle which allows ancillary tools to apply a rotational torque through the jaws or against the external handle when tightening or releasing the jaws.

C: A spring which fits inside the inner core and urges the opposing jaws apart. The spring acts close to the jaw fulcrum pins and it moves them apart transversely.

D: The handle is hollow and is partially threaded so it can advance and retract along the inner core. It can be removed for maintenance by unscrewing it from the rear of the inner core.

In the partially retracted position it exposes the horizontal slot and T bar forming of the inner core which allows removal of the jaws, necessary for maintenance, or jaw replacement.

At the front the handle incorporates an internal taper, which is parallel with the jaws as the handle advances it overcomes the bias of the jaw's springs and closes the jaws, if turned in the opposite direction the jaws open.

The handle incorporates a hexagonal profile to facilitate the optional use of spanners to aid tightening or release.

The handle has an ergonomic profile which makes it comfortable to hold while tightening or releasing.

The handle is open at the rear to allow the inner cores external hex configuration or internal square drive to protrude and be utilised by rotatable driving tools.

A purpose designed lever and integral surface pressure plate can be used in conjunction with the extraction tool's jaw fulcrum pins.

While certain novel features of this invention have been shown and described it will be understood that various omissions, substitutions and changes in the forms and details of the device illustrated and in its operations can be made by those skilled in the art without departing from the scope of the claims.

It will be further apparent that features of the present invention described in the specification (which term includes the claims) may be incorporated in embodiments of the present invention independently of other described features.

The extraction tool described above is a product which mechanically grips and locks onto partially exposed surface mounted, foreign objects, like semi-permanent mechanical fastening. The extraction tool uses a rotating handle 1 (arrow "A"), to apply a closing force across two serrated jaws 2 and 3, using external linear cams 7. The shape of jaw serrations 8, 9, 10 fulcrum pins 11 and varied articulation of the jaws are important to achieve optimum location and grip. The jaws external fulcrum lever pins 11, ensure that an efficient extraction force can be applied at the strongest and most appropriate point on the product with an optional lever and integral pressure plate 6; the latter protects the surface from unnecessarily breaking up during use.

The extraction tool could alternatively be used for mechanically gripping and locking onto accessories.

Thus, embodiments of the present invention relate to a tool suitable for mechanically gripping and locking onto objects such as accessories. Alternatively, they can be attached to partially exposed, surface mounted, foreign objects, like semi-permanent mechanical fastening.

It is therefore an aim of embodiments of the present invention to provide a tool which is able, efficiently and rapidly, to grip, or grip and extract fittings without causing significant damage to surfaces.

An extraction tool embodying the present invention comprises a rotating handle 1 (Arrow "A") and internal taper to apply a closing force across external linear cams 7 set in the sides of two serrated jaws 2 and 3. The opposing jaws are urged apart by a wound coil two arm spring, the spring being housed behind the horizontal slot of the threaded inner core. Each arm independently urging one half of the jaw's fulcrum pins outwards from the centre along the slots provided in the upper and lower T bars of the inner central core. The jaws are positioned in opposed alignment and prevented from twisting as they are held horizontal and articulate/slide from within the horizontal slotted bull-nosed threaded inner core. The jaws fixed fulcrum pins, hinge and slide transversely within transverse slots in the upper and lower T bars on the bull-nosed inner core, these offer a varied articulation of the jaws to optimise opportunities for locating and holding artefacts. This capability is enhanced by the shape of the opposing internal gripping portions of the jaw 8, 9, 10 and the longitudinal deepening V-shaped channel which combine to achieve optimum location encapsulation of fittings and satisfactory grip. The jaws external trunnion pins 11, ensure that the user can prevent the jaws from rotating as the handle advances along the threaded inner core, the handles internal taper acts on the jaws linear cams and closes the jaws, reversing direction of the handle and retracting it allows the jaws urged by their spring to open. The trunnion pins also offer an efficient extraction point for a two pronged lever force to be applied at the strongest and most appropriate point on the product. This is achieved by the optional use of a lever and integral pressure plate 6, the latter protects the surface from unnecessarily breaking up during use.

What is claimed is:

1. A hand tool for gripping an object, the hand tool comprising:

a core member extending along a longitudinal axis of the tool;

at least two jaws, moveable relative to the core member so as to be openable and closeable, but constrained in a forward direction substantially parallel with said longitudinal axis, at least a portion of each jaw extending from a first end of the core member generally in said forward direction when the jaws are closed, the respective extending portions each having a respective gripping surface; and a sleeve member arranged to be moveable substantially parallel with the longitudinal axis relative to the core member, the sleeve member having at least one forward facing jaw-engaging surface, the jaws, when open, each presenting a respective reverse facing engaging surface to the at least one jaw-engaging surface of the sleeve member;

the sleeve member being progressively moveable in the said forward direction to urge the at least one jaw-engaging surface of the sleeve member against the reverse facing engaging surfaces of the jaws, constraint of the jaws in said forward direction causing urging of the sleeve member against the jaws to force the jaws to close;

the hand tool further comprising two lever pins arranged to extend generally transverse to the longitudinal axis and coaxially from opposite sides of the hand tool at least when the jaws are closed, each lever pin extending from and being integral with a respective one of the jaws.

2. A hand tool in accordance with claim 1, wherein the core member is generally cylindrical and comprises an external screw thread, and the sleeve member comprises a correspondingly threaded bore extending along the longitudinal arm and arranged to receive and threadably engage the core member such that movement of the sleeve member along the longitudinal axis relative to the core member is effected by rotation of the sleeve member with respect to the core member about the longitudinal axis.

3. A hand tool in accordance with claim 2, wherein the screw thread is left-handed.

4. A hand tool in accordance with claim 1, wherein the sleeve member is generally cylindrical.

5. A hand tool in accordance with claim 1, wherein an outer surface of the sleeve member is adapted to be engaged by a spanner or socket for applying torque to the sleeve member about the longitudinal axis.

6. A hand tool in accordance with claim 1, wherein the sleeve member comprises a handle portion adapted to facilitate gripping and rotation of the sleeve member by hand.

7. A hand tool in accordance with claim 1, wherein a second end of the core member is arranged to extend through the sleeve member in the reverse direction beyond a first end of the sleeve member when the sleeve member is in contact with the jaws.

8. A hand tool in accordance with claim 7, wherein the second end of the core member is adapted to be engaged by a spanner or socket.

9. A hand tool in accordance with claim 7, wherein the second end of the core member is further adapted to receive and be engaged by a socket drive.

10. A hand tool in accordance with claim 1, wherein the jaws, when forced closed by the sleeve member, are each arranged to extend beyond a second end of the sleeve member in the forward direction.

11. A hand tool in accordance with claim 1, having two jaws.

12. A hand tool in accordance with claim 1, wherein the gripping surfaces of the jaws are arranged to close generally radially and symmetrically on the longitudinal axis when the jaws are forced to close by the sleeve member.

13. A hand tool in accordance with claim 1, wherein each gripping surface includes a respective flat portion arranged to oppose a corresponding flat portion of at least one other of the at least two jaws.

14. A hand tool in accordance with claim 1, wherein each gripping surface comprises respective teeth arranged to intermesh with corresponding teeth at least one other of the at least two jaws.

15. A hand tool in accordance with claim 1, wherein each gripping surface comprises respective teeth arranged to oppose but not intermesh with corresponding teeth on at least one other of the at least two jaws.

16. A hand tool in accordance with claim 1, wherein each gripping surface includes a respective generally V-shaped groove arranged to extend generally along the longitudinal axis to facilitating gripping of generally cylindrical objects.

17. A hand tool in accordance with claim 1, wherein the at least one forward facing jaw-engaging surface is inclined to face the longitudinal axis.

18. A hand tool in accordance with claim 1, wherein the forward facing jaw-engaging surface is generally frustoconical and radially disposed symmetrically about the longitudinal axis.

19. A hand tool in accordance with claim 1, wherein the jaws are pivotally coupled to the core member.

20. A hand tool in accordance with claim 19, wherein each jaw comprises a respective pivot pin extending from a side of the jaw, each pivot pin being received in a corresponding respective slot in the core member, each said slot extending in a plane substantially perpendicular to the longitudinal axis, the jaws and core member being adapted to permit rotation of each jaw about its respective pivot pin in a plane substantially parallel to the longitudinal axis and to permit movement of each pivot pin, in its respective slot, transverse to the longitudinal axis.

21. A hand tool in accordance with claim 20, wherein each jaw comprises two said respective pivot pins, the two pivot pins of each jaw extending coaxially from opposing sides of the jaw, the core member comprising at least one further slot, the at least one further slot extending in a plane parallel to the longitudinal axis, the at least one further slot being arranged to accommodate a portion of a respective associated one of said jaws to permit rotation of the associated one of said jaws about its pivot pins.

22. A hand tool in accordance with claim 20 having two jaws, the respective slots, pivot pins, jaws and core member being arranged to permit parallel separation of the gripping surfaces.

23. A hand tool in accordance with claim 20, wherein the pivot pins are constrained in their respective slots by the sleeve member when the jaws are closed.

24. A hand tool in accordance with claim 23, wherein the sleeve is movable in the reverse direction to release the pivot pin from their respective slots to enable decoupling of the jaws from the core.

25. A hand tool in accordance with claim 1, wherein, for each jaw, the respective reverse facing engaging surface is generally inclined at an angle to the respective gripping surface, the angle of inclination being generally the same as that between the jaw-engaging surface or surfaces of the sleeve member and the longitudinal axis.

26. A hand tool in accordance with claim 1, wherein the jaws are arranged to present said respective reverse facing engaging surfaces to the or each jaw-engaging surface of the sleeve member when the jaws are closed.

27. A hand tool in accordance with claim 1, in combination with a lever assembly, the lever assembly comprising a lever having a first end adapted to engage the lever pins of the hand tool, a second end providing a handle, and at least one fulcrum pin extending transversely from a region of the lever between the first and second ends, a plate member for positioning against a surface from which an object is to be extracted, and a fulcrum pin support member extending in a direction generally perpendicular to the plate member and providing a support for the fulcrum pin.

28. A combination in accordance with claim 27, wherein the fulcrum pin support is adapted to provide an adjustable height support for the fulcrum pin.

* * * * *